(12) United States Patent
Bakos et al.

(10) Patent No.: US 10,374,832 B2
(45) Date of Patent: Aug. 6, 2019

(54) OPTIMIZED RESOURCE MANAGEMENT IN CORE NETWORK ELEMENTS

(71) Applicant: NOKIA SOLUTIONS AND NETWORKS OY, Espoo (FI)

(72) Inventors: Istvan Bakos, Dorogháza (HU); Gyula Bodog, Budapest (HU); Attila Gabor Hilt, Budapest (HU); Laszlo Janosi, Budapest (HU); Gabor Jaro, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/529,611

(22) PCT Filed: Nov. 25, 2014

(86) PCT No.: PCT/EP2014/075539
§ 371 (c)(1),
(2) Date: May 25, 2017

(87) PCT Pub. No.: WO2016/082866
PCT Pub. Date: Jun. 2, 2016

(65) Prior Publication Data
US 2017/0264463 A1    Sep. 14, 2017

(51) Int. Cl.
*H04L 12/54*    (2013.01)
*H04L 12/26*    (2006.01)
(Continued)

(52) U.S. Cl.
CPC ............... *H04L 12/56* (2013.01); *G06F 9/50* (2013.01); *H04L 41/0896* (2013.01);
(Continued)

(58) Field of Classification Search
CPC ...... G06F 9/50; H04L 41/0896; H04L 49/602
See application file for complete search history.

(56) References Cited

U.S. PATENT DOCUMENTS

| 8,024,736 B1 | 9/2011 | Graupner et al. |
| 2001/0029545 A1 | 10/2001 | Takahashi et al. |
| 2002/0116479 A1 | 8/2002 | Ishida et al. |

FOREIGN PATENT DOCUMENTS

| EP | 2 570 922 A1 | 3/2013 |
| JP | 2000-092052 A | 3/2000 |

(Continued)

OTHER PUBLICATIONS

International Search Report & Written Opinion dated Mar. 10, 2015 corresponding to International Patent Application No. PCT/EP2014/075539.

(Continued)

*Primary Examiner* — Harry S Hong
(74) *Attorney, Agent, or Firm* — Squire Patton Boggs (US) LLP (57) ABSTRACT

The present invention addresses method, apparatus and computer program product for resource management within a distributed system in a core network element, comprising organizing computing resources of the core network element into sets, wherein a first set is always active, setting an upper threshold and a lower threshold for the load of the sets, wherein the sets in operation are loaded as long as the average load of the sets in operation reaches the upper threshold, and when the upper threshold is exceeded, a new set is activated, whereas, when the load thereof falls below the lower threshold, the last activated set is deactivated, assigning a priority number to each set, segmenting an interval of random numbers for randomizing a request distribution in subintervals which are allocated to the computing resources of the active sets, wherein the length of each subinterval is determined based on the priority number of the set of the respective computing resource, and allotting a random number out of the interval to an incoming request, and forwarding the request to such computing resource which belongs to the subinterval that contains the allotted random number.

12 Claims, 8 Drawing Sheets

(51) Int. Cl.
  *G06F 9/50* (2006.01)
  *H04L 12/24* (2006.01)
  *H04L 12/931* (2013.01)
  *H04L 12/70* (2013.01)

(52) U.S. Cl.
  CPC ........ *H04L 43/0876* (2013.01); *H04L 49/602* (2013.01); *H04L 2012/5631* (2013.01); *H04Q 2213/13164* (2013.01); *H04Q 2213/13349* (2013.01)

(56) References Cited

FOREIGN PATENT DOCUMENTS

| JP | 2002-251344 A | 9/2002 | |
| JP | 2006-301749 A | 11/2006 | |
| WO | WO 2010/101935 A1 | 9/2010 | |
| WO | WO 2010/050041 A1 | 3/2012 | |
| WO | WO 2013/006708 A1 | 1/2013 | |
| WO | WO 2013037619 A1 * | 3/2013 | ............. G06F 9/505 |

OTHER PUBLICATIONS

"Network Function Virtualization (NFV) Management and Orchestration; GS NFV-MAN 001," ETSI Draft; GS NFV-MAN 001 V0.8.1 (Nov. 2014), European Telecommunications Standards Institute ETSI), Nov. 21, 2014, pp. 1-189, XP014216382.

"Network Functions Virtualisation (NFV); Virtual Network Functions Architecture; Draft ETSI GS NFV-SWA 001," ETSU Draft; Draft ETSI GS NFV-SWA 001 V0.2.4 (Nov. 2014), European Telecommunications Standards Institute (ETSI); Nov. 24, 2014, pp. 1-92, XP014222458.

Notification of Reason(s) for Rejection dated Jul. 2, 2018 corresponding to Japanese Patent Application No. 2017-528180.

* cited by examiner

OPTIMIZED RESOURCE MANAGEMENT IN CORE NETWORK ELEMENTS

FIELD OF THE INVENTION

The present invention generally relates to wired and wireless communication networks, and more specifically relates to a method, apparatus and computer program product for enabling improved load balancing, in particular optimized resource management in core network element for improved horizontal scaling in distributed systems.

BACKGROUND

In order to save costs, telecommunications operators often require the virtualization of radio and core network components from infrastructure vendors. In practice, all the core network components shall be able to run on the same Cloud infrastructure. Besides saving costs, e.g. via spending on uniform hardware (HW) for all the core network components, operators desire that the computing resources, such as virtualized network elements may also utilize the benefits of e.g. a Cloud, and so further optimizing the utilization of the available hardware resources. One of such benefits is the possibility of horizontal scalability, which is also known as scale in/out, of virtual appliances in a Cloud.

As an ordinary (virtual) appliance e.g. on a Cloud, core network elements shall support such horizontal scaling behavior. In practice, it means that it shall be possible to remove (scale-in) or add (scale-out) computing resources, such as virtual machines (VMs), from/to a (virtual) appliance (here a core network element). This would provide the possibility to 'shrink' the number of required computing resources to handle the traffic in the low-traffic (e.g. night hours), while dynamically adding new computing resources, such as virtual machines VM, depending on the capacity need for the duration of the high-traffic (e.g. daytime hours).

In regard of telecommunications network elements with a strict expected grade of service, computing resource removal at a scale-in procedure must not cause any service disturbance. In case of network elements as addressed according to the present invention, the main service which is provided is the handling of calls between subscribers. That is, the removal of a computing resource from e.g. a Mobile Switching Center Server (MSS) or a Telecommunication Application Server (TAS) must not disturb any ongoing call set-up, or any ongoing active phase call. In other words, the removal of the computing resource, such as a VM, must be graceful. The corresponding network element where such graceful scale-in procedure for a data session is required, is e.g. the SGSN/MME.

In order to hide this scaling of computing resources of the network element from the external world, it is a well-known practice to utilize load balancers on the edge of the network element. Load Balancers (LBs) terminate traffic from the external world, and they distribute the incoming traffic among the internal computing resources of the network element. On this way, load balancers can be utilized to decide whether a particular active computing resource may receive new call requests, or if the internal computing resource is marked for graceful shutdown, the marked computing resource should not receive new call requests, but of course the traffic for ongoing sessions on that computing resource should be still directed to that computing resource.

Thereby, it becomes apparent that with this logic the computing resource becomes 'empty' after a while, once the ongoing sessions handled by the computing resource are terminated by the participants.

On the other hand, it is apparent that generally the length of a call cannot be predicted. That is, it cannot be foreseen when an ongoing, active phase call will be finished by the participants. It means that a situation may occur when the computing resource, such as the VM, cannot be shut down because of some small number of very long call sessions.

The present specification is related to scale-in and scale-out that is referred to horizontal scaling.

Basically, scale-out functionality enables Functional Units' (FUs) capacity to be increased by adding computing resources to handle increased traffic. On the contrary, the scale-in functionality enables functional units' capacity to be reduced by removing computing resources from traffic. Horizontal scaling is already a de-facto operators' requirement that shall be addressed by all equipment vendors.

As becomes apparent from the introduction above, there exists the problem that the length of calls can generally not be predicted. So, if the generic load balancer logic is followed, and the incoming traffic among internal computing resources is shared on such way, that all computing resources have the same CPU load and memory consumption, it means that when it is desired to shut down a computing resource gracefully in low traffic hours, it may handle the same amount of calls than the computing resources that are not selected for shutdown, i.e. long calls may appear in that computing resource with the same probability as in other computing resources. In order to lower this probability, there is the need for improved load balancer logic.

SUMMARY OF THE INVENTION

Therefore, in order to overcome the drawbacks of the prior art, it is an object underlying the present invention to enable improved load balancing.

In particular, it is an object of the present invention to provide a method, apparatus and computer program product for providing optimized resource management in core network element, which may either be configured in a cloud based environment or in a non-cloud environment.

According to a first aspect of the present invention, there is provided a method for resource management within a distributed system in a core network element, comprising organizing computing resources of the core network element into sets, wherein a first set is always active, setting an upper threshold and a lower threshold for the load of the sets, wherein the sets in operation are loaded as long as the average load of the sets in operation reaches the upper threshold, and when the upper threshold is exceeded, a new set is activated, whereas, when the load of the last activated set falls below the lower threshold, the last activated set is deactivated, assigning a priority number to each set, segmenting an interval of random numbers for randomizing a request distribution in subintervals which are allocated to the computing resources of the active sets, wherein the length of each subinterval is determined based on the priority number of the set of the respective computing resource, and allotting a random number out of the interval to an incoming request, and forwarding the request to such computing resource which belongs to the subinterval that contains the allotted random number.

According to a second aspect of the present invention, there is provided an apparatus for resource management within a distributed system in a core network element, comprising at least one processor, and at least one memory for storing instructions to be executed by the processor, wherein the at least one memory and the instructions are configured to, with the at least one processor, cause the apparatus at least to perform organizing computing resources of the core network element into sets, wherein a first set is always active, setting an upper threshold and a lower threshold for the load of the sets, wherein the sets in operation are loaded as long as the average load of the sets in operation reaches the upper threshold, and when the upper threshold is exceeded, a new set is activated, whereas, when the load of the last activated set falls below the lower threshold, the last activated set is deactivated, assigning a priority number to each set, segmenting an interval of random numbers for randomizing a request distribution in subintervals which are allocated to the computing resources of the active sets, wherein the length of each subinterval is determined based on the priority number of the set of the respective computing resource, and allotting a random number out of the interval to an incoming request, and forwarding the request to such computing resource which belongs to the subinterval that contains the allotted random number.

According to a third aspect of the present invention, there is provided a computer program product comprising computer-executable components which, when the program is running, are configured to carry out the steps of organizing computing resources of the core network element into sets, wherein a first set is always active, setting an upper threshold and a lower threshold for the load of the sets, wherein the sets in operation are loaded as long as the average load of the sets in operation reaches the upper threshold, and when the upper threshold is exceeded, a new set is activated, whereas, when the load of the last activated set falls below the lower threshold, the last activated set is deactivated, assigning a priority number to each set, segmenting an interval of random numbers for randomizing a request distribution in subintervals which are allocated to the computing resources of the active sets, wherein the length of each subinterval is determined based on the priority number of the set of the respective computing resource, and allotting a random number out of the interval to an incoming request, and forwarding the request to such computing resource which belongs to the subinterval that contains the allotted random number.

Advantageous further developments or modifications of the aforementioned exemplary aspects of the present invention are set out in the dependent claims.

According to certain embodiments of the present invention, the bigger the priority number is, the longer is the length of the subinterval.

Further, according to certain embodiments of the present invention, when a set of computing resources is in an inactive state or already scaled in, its priority number indicating zero priority.

Further, according to certain embodiments of the present invention, if the load of a single set reaches the upper threshold, its priority number becomes maximal, indicating that the set receives incoming requests with highest priority.

Further, according to certain embodiments of the present invention, if a new set is loaded, its priority number is dynamically changeable from a preset starting value up to its maximal value, dependent on the real-time traffic.

Further, according to certain embodiments of the present invention the core network element may be a Telecommunication Application Server (TAS), a Mobile Switching Server MSS, a Mobility Management Entity MME, a Serving GPRS Support Node SGSN, or may be any of Call Session Control Function CSCF, Home Subscriber Server HSS, Gateway GPRS support node GGSN, etc.

BRIEF DESCRIPTION OF DRAWINGS

For a more complete understanding of example embodiments of the present invention, reference is now made to the following descriptions taken in connection with the accompanying drawings in which:

FIG. 7, which consists of FIGS. 7a and 7b shows a flowchart according to certain embodiments of the present invention.

DESCRIPTION OF EXEMPLARY EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described e.g. in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

In particular, the following examples, versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

In general, a telecommunication network comprises plural network elements, such as base stations BTS, evolved NodeB's (eNB; i.e. base station in LTE environment), user equipments UE (e.g. mobile phone, smart phone, Computer, etc.), controllers, interfaces, etc, and in particular any equipment used in the provision of a telecommunications service.

Further, it is to be noted that a core network element as mentioned herein may be e.g. a Telecommunication Application Server (TAS), a Mobile Switching Server (MSS), a Mobility Management Entity (MME), a Serving GPRS Support Node (SGSN), or any call processing node, but is not limited thereto.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a base station and a communication network besides those described in detail herein below.

As already indicated above, the current load balancing algorithms do not support a logic involving that some computing resources, such as VMs, should be prioritized. However, such algorithm could load the high order computer resources, and overflow traffic to other low order computing resources only if those high order computing resources reach a given load level. Such algorithm would help in many situations. For example in Cloud based environments the system could focus the load on some computing resources, such as VMs, and overflow load to other computing resources, such as VMs, only when necessary, which would enable much more dynamic resource management in the Cloud, such that unnecessary computing resource (CRs) could be used other purpose or they could be shut down.

Such algorithm would also help in the situation when the length of the sessions cannot be influenced (e.g. call duration), and long sessions may prevent the graceful removal of a computing resource from the system. Such new algorithm would mean, that long sessions are maintained on those low order computing resources with less probability, since it is not desired to disconnect the very long calls forcibly due to the removal of a computing resource.

Besides, even if cloud environment is one application field of the present invention, it is however noted that the present invention is not limited to cloud environment only, but may also be applied in a non-cloud environment. Further, a Virtual Machine (VM) is one example of a computing resource according to some aspects of the present invention; however the present invention is not limited thereto.

Figure 1:
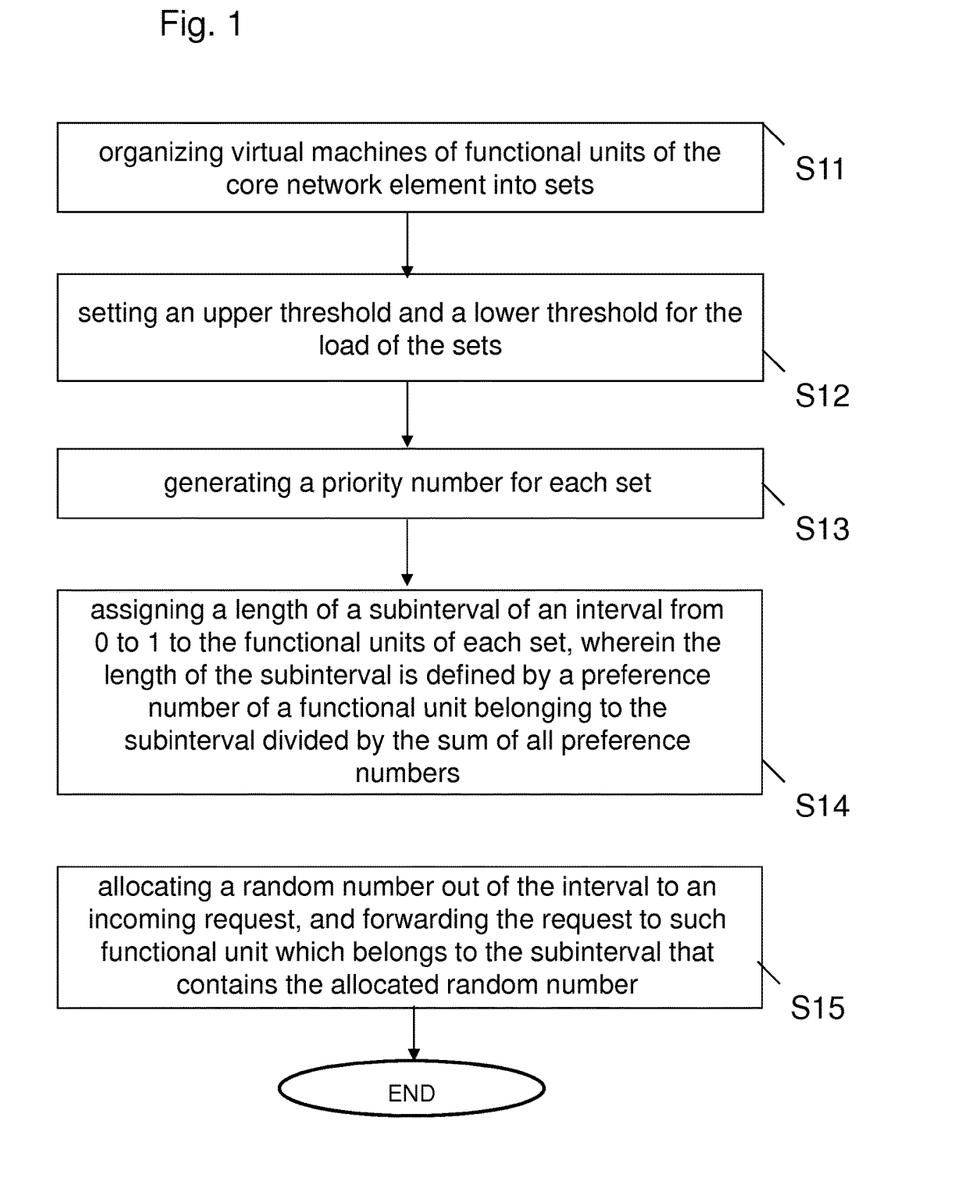
FIG. 1 illustrates a method according to certain embodiments of the invention.

FIG. 1 shows a method according to some example versions of the disclosure.

In Step S11, computing resources of the core network element are organized into sets, wherein a first set (i.e. the base increment) is always active.

Then, in Step S12, an upper threshold and a lower threshold for the load of the sets is set, wherein the sets in operation are loaded as long as the average load of the sets in operation reaches the upper threshold, and when the upper threshold is exceeded, a new set is activated, whereas, when the load of the last activated set falls below the lower threshold, the last activated set is deactivated.

Further, in Step S13, a priority number is assigned to each set. This assigned priority number should be the maximal feasible priority for the respective set.

Moreover, in Step S14, an interval of random numbers for randomizing a request distribution is segmented in subintervals which are allocated to the computing resources of the active sets, wherein the length of each subinterval is determined based on the priority number of the set of the respective computing resource.

Figure 2:
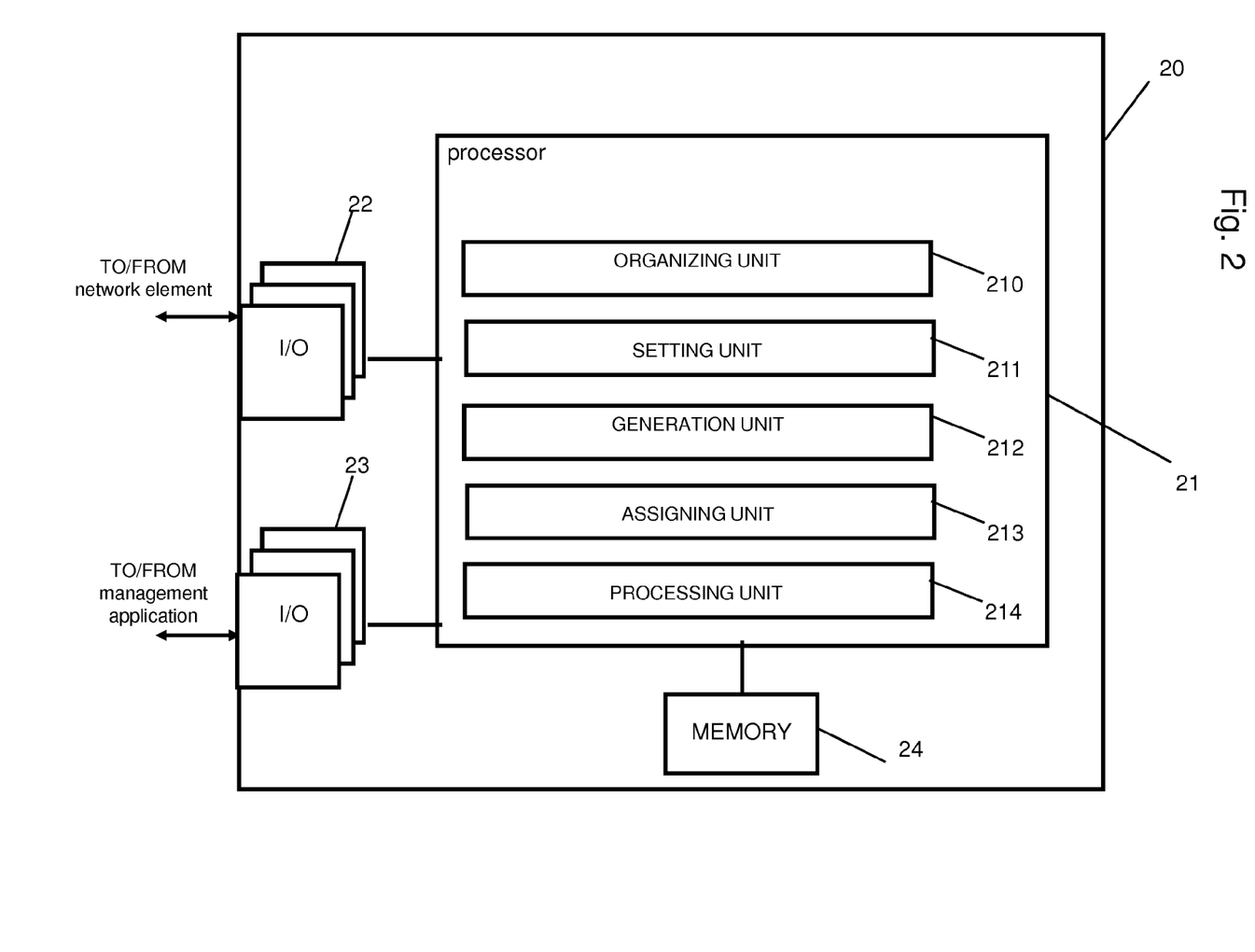
FIG. 2 schematically illustrates an apparatus according to certain embodiments of the invention.

Still further, in Step S15, a random number out of the interval is allotted to an incoming request, and the request is forwarded to such computing resource which belongs to the subinterval that contains the allocated random number In FIG. 2, a diagram illustrating a configuration of an element comprised in a (tele-) communication network element according to some example versions of the disclosure is shown, which is configured to implement resource management of a core network element in a cloud based environment as described in connection with some of the example versions of the disclosure. The embodiment may be carried out in or by a network element. It is to be noted that the network element may comprise elements or functions, such as a chipset, a chip, a module etc., which can also be part of a network element or attached as a separate element to a network element, a Virtual Machine, or the like. It should be understood that each block and any combination thereof may be implemented by various means or their combinations, such as hardware, software, firmware, one or more processors and/or circuitry.

The network element 20 shown in FIG. 2 may comprise a processing function, control unit or processor 21, such as a CPU or the like, which is suitable for executing instructions given by programs or the like related to the network element control procedure.

The processor 21 is configured to execute processing related to the above described resource management of a core network element in a cloud based environment. In particular, the processor 21 comprises a sub-portion 210 as an organizing unit configured to organize computing resources of the core network element into sets, wherein a first set is always active. The portion 210 may be configured to perform processing according to S11 of FIG. 1. Furthermore, the processor 21 comprises a sub-portion 211 usable as a setting unit configured to set an upper threshold and a lower threshold for the load of the sets, wherein the sets in operation are loaded as long as the average load of the sets in operation reaches the upper threshold, and when the upper threshold is exceeded, a new set is activated, whereas, when the load thereof falls below the lower threshold, the last activated set is deactivated. The portion 211 may be configured to perform processing according to S12 of FIG. 1. Furthermore, the processor 21 comprises a sub-portion 212 usable as a assigning unit configured to assign a priority number to each set. The portion 212 may be configured to perform processing according to S13 of FIG. 1. Still further, the processor 21 comprises a sub-portion 213 usable as segmenting unit configured to segment an interval of random numbers for randomizing a request distribution in subintervals which are allocated to the computing resources of the active sets, wherein the length of each subinterval is determined based on the priority number of the set of the respective computing resource. The portion 213 may be configured to perform processing according to S14 of FIG. 1. Moreover, the processor 21 comprises a sub-portion 214 usable as a processing unit configured to allot a random number out of the interval to an incoming request, and forwarding the request to such computing resource which belongs to the subinterval that contains the allocated random number. The portion 214 may be configured to perform processing according to S15 of FIG. 1.

Reference signs 22 and 23 denote transceiver or input/output (I/O) units (interfaces) connected to the processor 21. The I/O units 22 may be used for communicating with e.g. network elements. The I/O units 23 may be used for communicating with e.g. a management application. Reference sign 24 denotes a memory usable, for example, for storing data and programs to be executed by the processor 21 and/or as a working storage of the processor 21.

According to certain embodiments of the present invention, first of all, computing resources are organized into sets. Such a set in theory can contain any number of computing resources, but at most as much as total available. In practice, however without restricting the scope of the present invention, the base increment has a minimum of two, the other increments have at least one FU. On one hand, we can minimize the chance that a newly activated computing resource is overloaded immediately (after scale-out) by organizing computing resources into sets. On the other hand, we can manage more CPU resources at once.

The base increment is a set which always exists and is always active.

Figure 3:
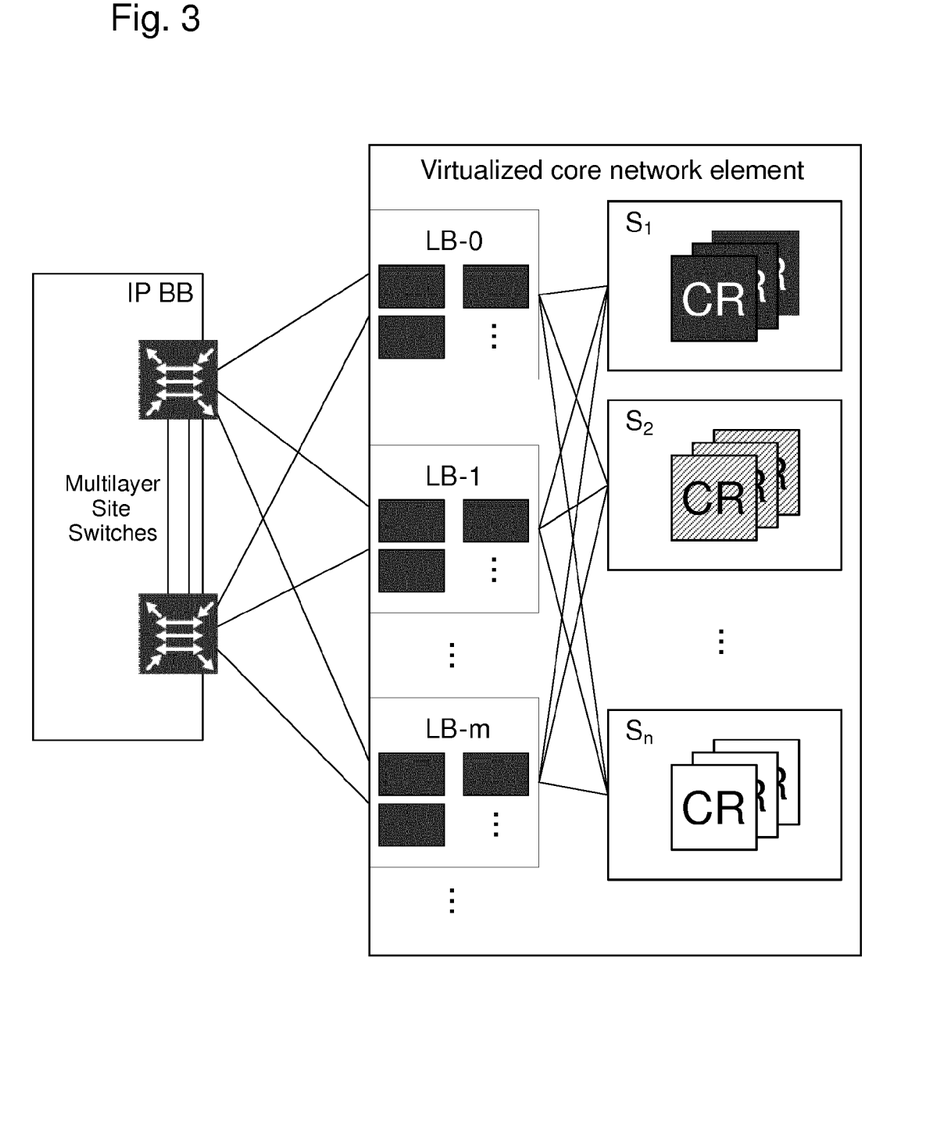
FIG. 3 schematically shows a network element configuration according to certain embodiments of the present invention, in which the FUs are organized into sets.

This kind of configuration can be seen in FIG. 3. In particular, FIG. 3 schematically shows a network element configuration according to certain embodiments of the present invention, in which the computing resources (CR) are organized into sets S1 to Sn in a virtualized core network element, which are connected to plural load balancers, e.g. LB-0 to LB-m. The LBs may be switched by e.g. multilayer site switches.

The second step is that an upper threshold (e.g. $L_{UT}$=60%) of the load of the sets is fixed. The goal is to achieve that active sets are loaded as long as the average load reaches the given upper threshold ($L_{UT}$). It is very useful, because a new set will be placed in active state if and only if this given upper threshold is exceeded in terms of the average load of the active sets.

Similarly, a lower threshold (e.g. $L_{LT}$=10 or 20%) of the load of the sets is set. It is also very useful, because the last (active) set will be placed in inactive state if and only if the load of the last set is under this given lower threshold.

In addition, all sets are given a priority number. Thereby, at least one of the following conditions is to be met. Firstly, each computing resource has the same priority number within its set, but the priority number of a computing resource is also dynamically changeable dependent on the real-time traffic. The bigger the priority number of a computing resource is, the higher is the probability for assigning a request to this computing resource. Then, if a set of CRs is in inactive state or already scaled in, its priority number is zero. If a set reaches the lower limit, i.e. falls below the lower threshold, it means that this set is intended to be deactivated, i.e. no more load is directed to that set. Further, if the load of a single set reaches the upper threshold ($L_{UT}$), its priority number becomes maximal (M, where M is common for all the sets that have already reached $L_{UT}$). M is a configurable parameter. Still further, if a new set is loaded, its priority number is dynamically changeable up to M (depending on the real-time traffic). In the case of the depicted embodiment, the starting value of the priority number is M/3, but it can be tailored according to the need.

That is, priority numbers can be tailored according to the need, e.g. different scales can be used. In the present embodiment, the maximum M is set to 60 according to the given upper threshold.

Finally, the request distribution is randomized. The randomization process according to certain embodiments of the present invention is shown in FIG. 4.

Figure 4:
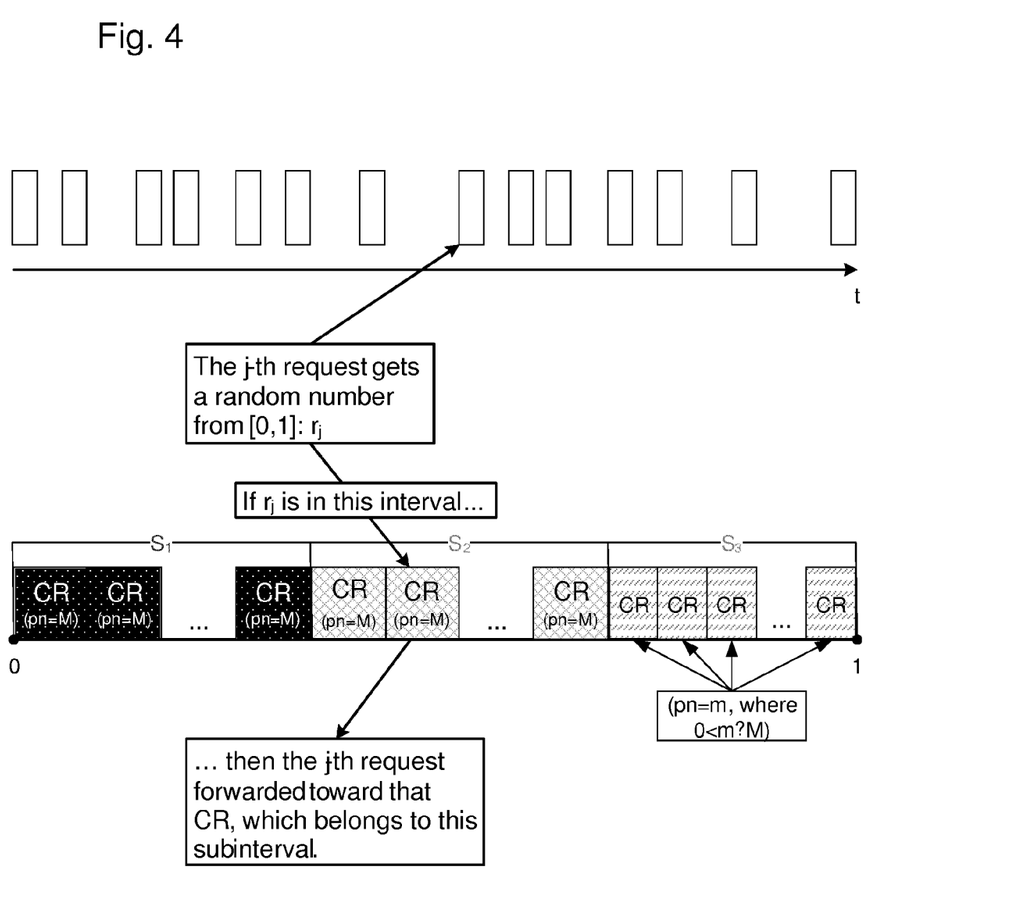
FIG. 4 shows a conceptual illustration of the randomization algorithm according to certain embodiments of the present invention.

In FIG. 4, the top line shows the incoming requests. Such a subdivision of an interval e.g. [0,1] can be seen on the lower part of FIG. 4, in which each subinterval belongs to different computing resource (CR). The respective shade of the CRs indicates the set they belong to.

The length of the subintervals is determined in real time by the following formula:

$$\text{length of subinterval} = \frac{\text{priority number of } CR \text{ belonging to the subinterval}}{\text{the sum of all priority numbers}}$$

That is, the bigger the CR's priority number is, the bigger its corresponding subinterval is. The incoming requests are distributed randomly, because every request gets a random number from e.g. [0,1]. The request is forwarded to that CR, which CR belongs to the subinterval that contains the allocated random number.

Figure 5:
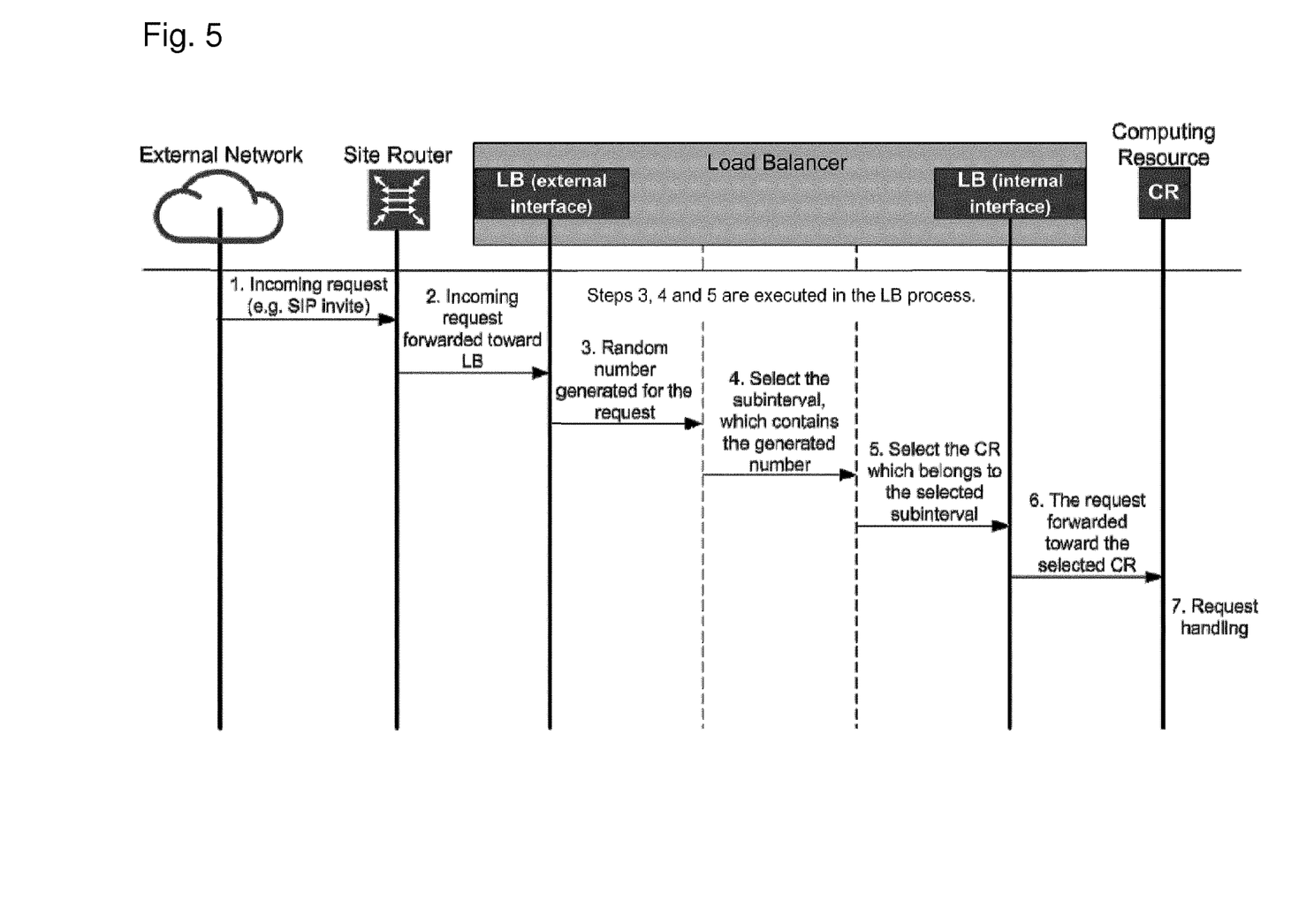
FIG. 5 shows a signaling chart of the algorithm according to certain embodiments of the present invention.

Summarizing the foregoing, the theoretical signaling chart of the algorithm can be seen in FIG. 5.

In Step 1, an incoming request, e.g. a SIP invite message, is forwarded to the external interface of the load balancer.

The following Steps are executed in the load balancer process. In particular, in Step 2, a random number for the request is generated. Then, in step 3, the subinterval which contains the generated number is selected. In step 4, the CR which belongs to the selected subinterval is selected. Subsequently, in step 5, the request is forwarded to the selected CR from the internal interface of the load balancer. Finally, in step 6 the request is handled by the selected CR.

Based on the above, the invention according to certain embodiments thereof is capable of managing the following load conditions, which are depicted in FIGS. 6a to 6d.

Figure 6A:
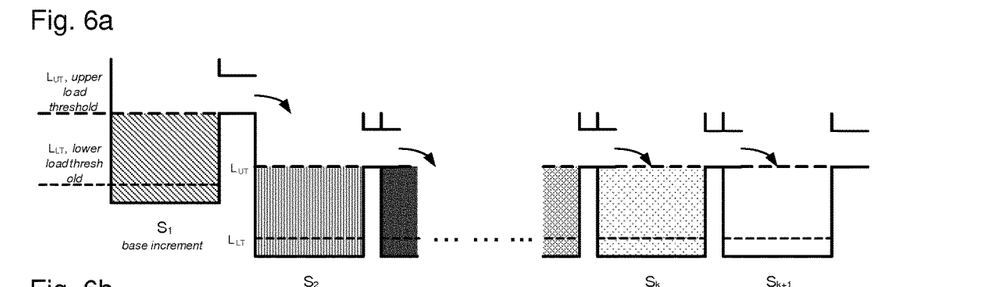
FIG. 6a schematically illustrates a management according to certain embodiments of the present invention, in a load condition when a new set can be scaled out (overflow)
Figure 7A:
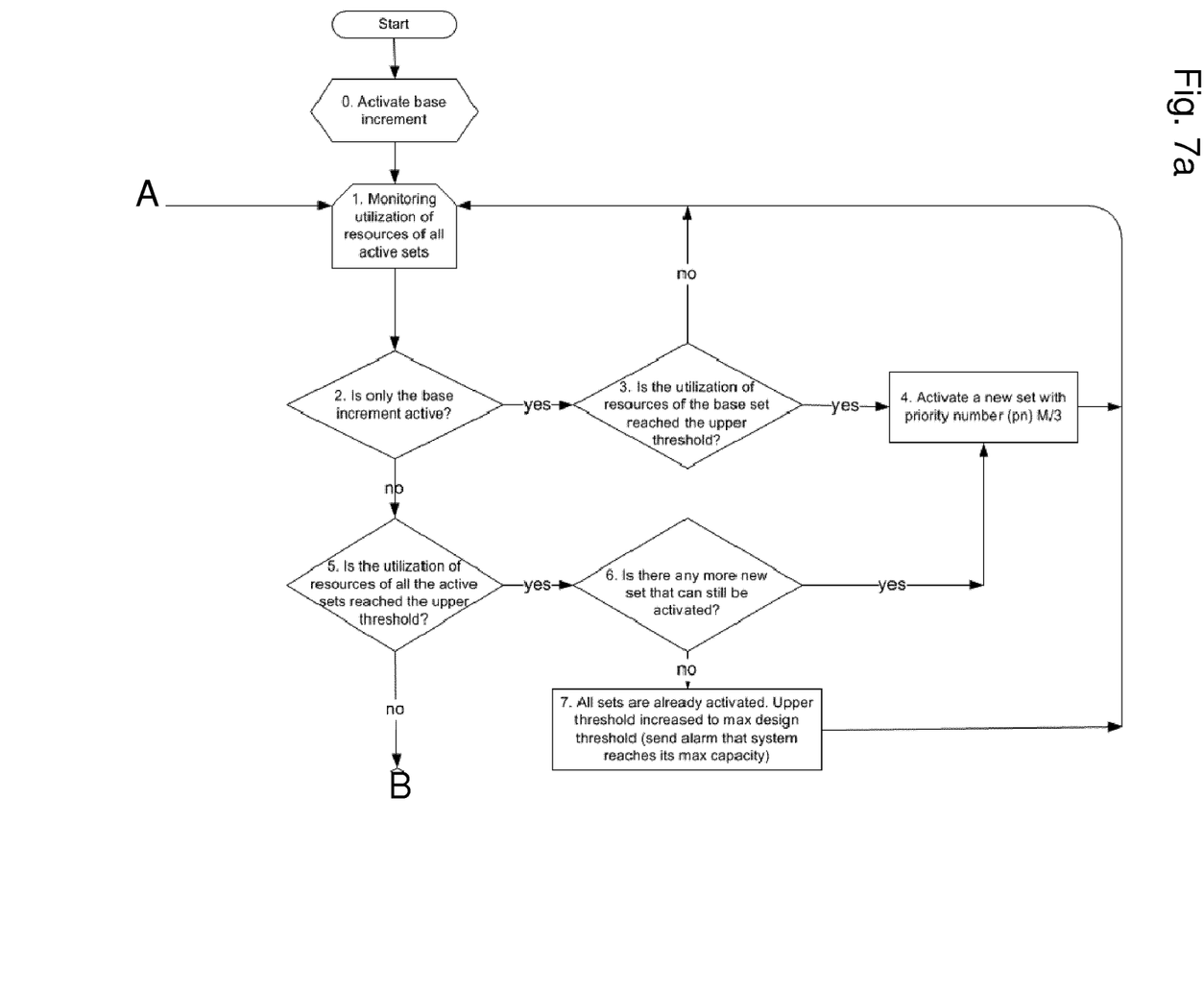

FIG. 6a schematically illustrates a management according to certain embodiments of the present invention, in a load condition when a new set can be scaled out (overflow). In particular, as can be seen in FIG. 7a, the load of all active sets $S_1$ to $S_k$ reaches the given upper threshold $L_{ut}$, therefore, an overflow traffic to a new set is performed. That is, the traffic over the threshold must flow into a new set $S_{k+1}$.

Figure 6B:
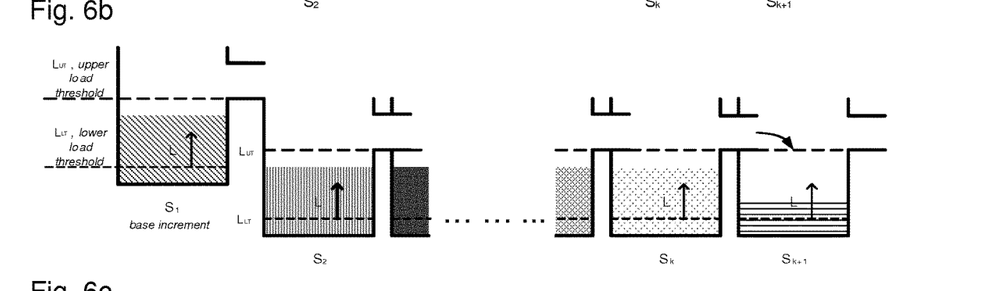
FIG. 6b schematically illustrates a management according to certain embodiments of the present invention, in a load condition when the priority number of the last (active) set can be increased (overflow)

FIG. 6b schematically illustrates a management according to certain embodiments of the present invention, in a load condition when the priority number of the last (active) set can be increased (overflow). In particular, in the case illustrated in FIG. 7b, the load increases (L↑), therefore the priority (number) of the last set can be increased. That is, the last set must manage more traffic.

Figure 6C:
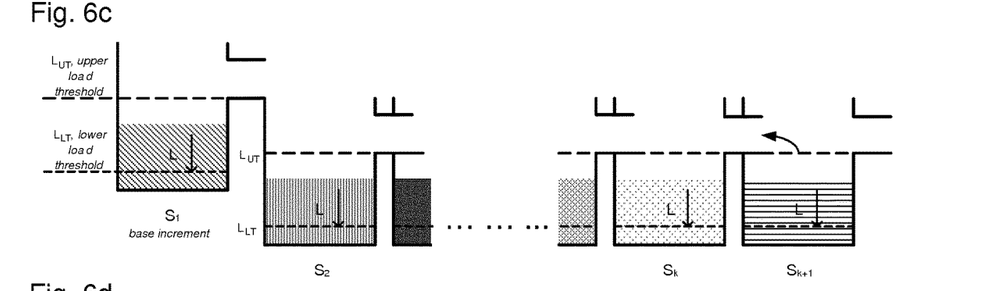
FIG. 6c schematically illustrates a management according to certain embodiments of the present invention, in a load condition when the priority number of the last (active) set can be decreased (backflow)

FIG. 6c schematically illustrates a management according to certain embodiments of the present invention, in a load condition when the priority number of the last (active) set can be decreased (backflow). In particular, as becomes apparent from the case illustrated in FIG. 7c, the load decreases (L↓), therefore the priority (number) of the last set can be decreased. That is, the last set can manage less traffic.

Figure 6D:
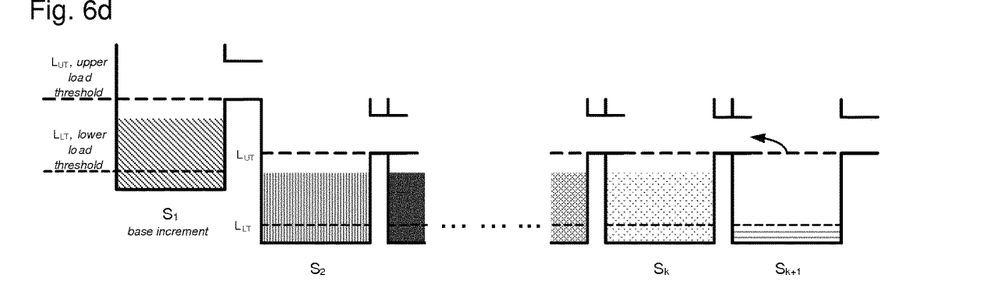
FIG. 6d schematically illustrates a management according to certain embodiments of the present invention, in a load condition when the last set (active) can be scaled in (backflow)

FIG. 6d schematically illustrates a management according to certain embodiments of the present invention, in a load condition when the last set (active) can be scaled in (backflow). That is, the load of the last active set is below the given lower threshold $L_{Lt}$, therefore the last set $S_{k+1}$ can be deactivated.

This method as is illustrated in FIGS. 6a to 6d can be viewed like a modified leaky bucket model which is bidirectional. It is very important to notice that the load can be overflowed and similarly flowed back. It is also worth mentioning that incoming requests are not distributed evenly among the active sets. The last set typically handles fewer requests therefore the last set is obvious target for scale-in (faster to empty).

Figure 7B:
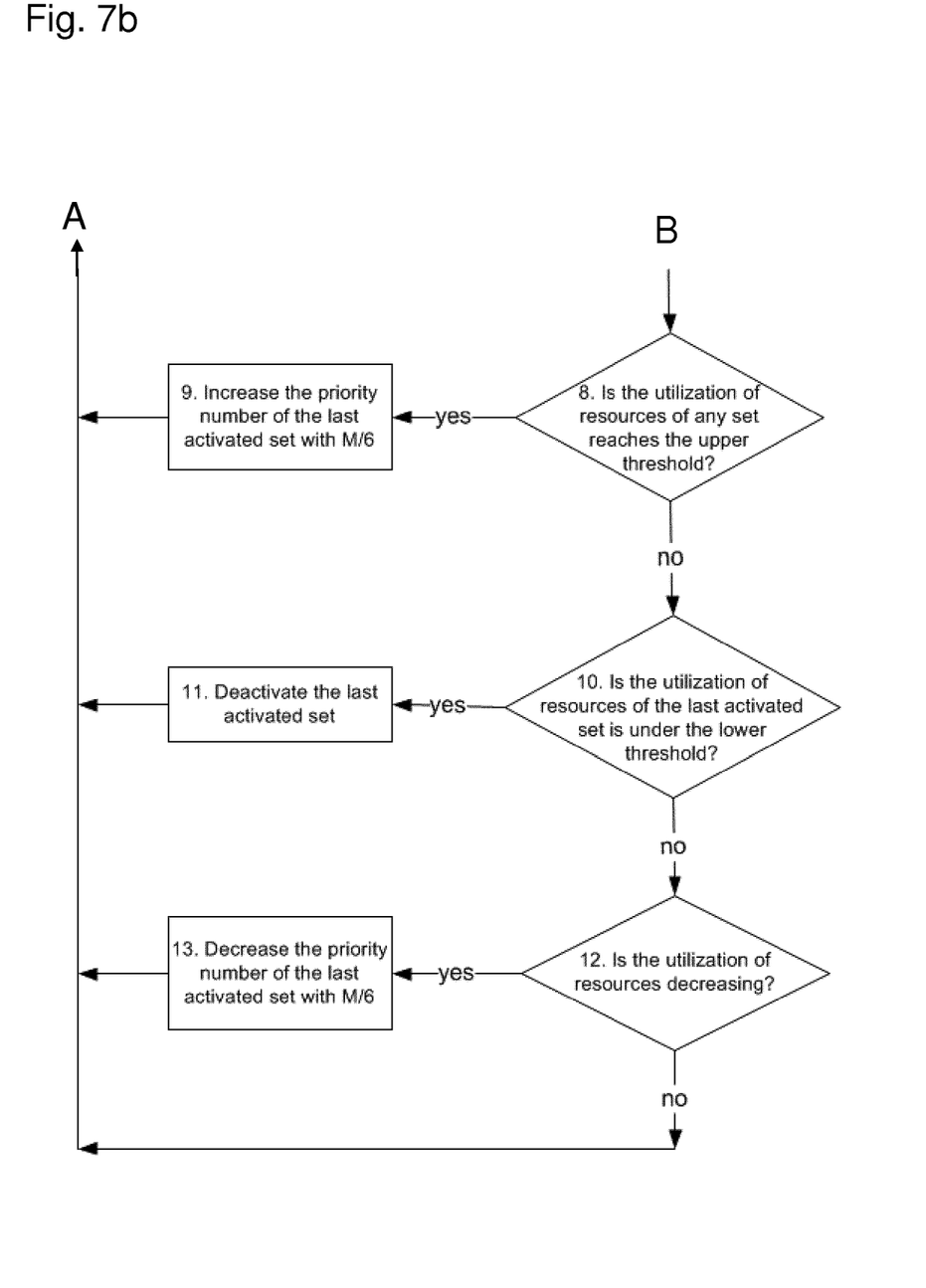

FIG. 7, which consists of FIGS. 7a and 7b, shows a flowchart according to certain embodiments of the present invention.

After starting the procedure, base increment is activated. In step 1, utilization of resources of all active sets is monitored. In step 2, it is determined whether only the base increment is active. When only the base increment is active (Yes in S2), it is determined in step 3 whether the utilization of resources of the base set has reached the upper threshold. If not (No in S3), the process resumes to step 1, and if the threshold is reached (Yes in S3), a new set with priority number (pn) M/3 is activated in step 4, and the process resumes to step 1. When also other sets are active (No in S2), it is determined in step 5 whether the utilization of resources of all the active sets has reached the upper threshold. If this is the case (Yes in S5), it is determined in Step 6 if there is any more new set that can still be activated. If so (Yes in S6), the process proceeds to step 4. Otherwise, in case no other set can be activated (No in S6), all sets are already activated. In step 7 the upper threshold is increased to maximal design threshold, and a alarm may be issued that the system reaches its maximum capacity. The process resumes to step 1.

If 'No' is determined in step 5, now referring to FIG. 7b, it is determined in step 8 whether the utilization of resources of any set reaches the upper threshold. If this is the case (Yes in S8), the priority number of the last activated set is increased with M/6 in step 9, and the process resumes to step 1. Otherwise (No in S8), it is determined in step 10 whether the utilization of resources of the last activated set is under the lower threshold. If this is the case (Yes in S10), the last activated set is deactivated in step 11, and the process resumes to step 1. Otherwise (No in S10), it is determined in step 12 whether the utilization of resources is decreasing. If this is the case (Yes in S12), the priority number of the last activated set is decreased with M/6 in step 13, and the process resumes to step 1. Otherwise (No in S12), the process immediately resumes to step 1.

The present invention may be extended to all Network Elements with distributed architecture. That is, it may be applied to any distributed system which comprises multiple computer resources.

Basically, there are major advantages of using the algorithm according to the present invention. On the one hand, better utilization of existing resources is possible. Further, either energy can be saved by switching off unnecessary computing resources, or free computing resources can be allocated for other processes. Still further, task handling can become more cost-efficient.

The biggest advantage is that only the necessary amount of resources is utilized. Once it is decided to remove computing resources (set of computing resources) from the system at low load, it can be assured that lower orders computing resources have less traffic to handle than higher order computing resources. So the lowest order computing resources can be emptied faster on a graceful way, which allows service continuity.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under GSM, 3G, LTE™ or LTE-Advanced, and can advantageously be implemented also in controllers, base stations, user equipments or smart phones, or computers connectable to such networks. That is, it can be implemented e.g. as/in chipsets to connected devices.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:
CPU Central Processing Unit
CR Computing Resource (can be e.g. functional unit of the network element or virtual machine)
HW Hardware
IP Internet Protocol
IP BB IP Backbone
L Load
LB Load Balancer
$L_{LT}$ Lower Load Threshold
$L_{UT}$ Upper Load Threshold
NE Network Element
MGW Media Gateway
MSC Mobile Switching Center
MSS MSC Server
TAS Telecommunication (also called Telephony) Application Server
$S_i$ $i^{th}$ set
SR Site Router
VM Virtual Machine Further, the following terms are used in the above specification, which are to be understood as follows:
pool group of Computing Resources, wherein the term 'set' in used herein
pn priority number
set group of Computing Resources
active set set of CRs, which can receive requests and handle calls
inactive set set of CRs, which can only handle ongoing calls, but not allowed to accept new requests

What is claimed is:

1. A method for resource management within a distributed system in a core network element, comprising:
    organizing computing resources of the core network element into sets, wherein a first set is always active, and wherein a load of incoming traffic is associated with each set;
    controlling distribution of incoming traffic by setting an upper threshold and a lower threshold for the load of the sets, wherein the sets in operation are loaded as long as the average load of the sets in operation reaches the upper threshold, and when the upper threshold is exceeded, a new set is activated, whereas, when the load of the last activated set falls below the lower threshold, the last activated set is deactivated;
    assigning a priority number to each set which provides an indication of an amount of traffic manageable by each set;
    segmenting an interval of a group of random numbers for randomizing a request distribution into subintervals which are allocated to the computing resources of the active sets, wherein the length of each subinterval is determined based on the priority number of the set of the respective computing resource; and
    allotting a random number out of the interval to an incoming request, and forwarding the request to such computing resource which belongs to the subinterval that contains the allotted random number,
    wherein, if the load of a single set reaches the upper threshold, its priority number becomes maximal, indicating that the set receives incoming requests with highest priority.

2. The method according to claim 1, wherein the bigger the priority number is, the longer is the length of the subinterval.

3. The method according to claim 1, wherein, when a set of computing resources is in an inactive state or already scaled in, its priority number indicating zero priority.

4. The method according to claim 1, wherein, if a new set is loaded, its priority number is dynamically changeable from a preset starting value up to its maximal value, dependent on the real-time traffic.

5. The method according to claim 1, wherein the core network element is a Telecommunication Application Server, a Mobile Switching Server, a Mobility Management Entity, a Serving GPRS Support Node, or a call processing node.

6. An apparatus for resource management within a distributed system in a core network element, comprising:
    at least one processor, and
    at least one memory for storing instructions to be executed by the processor,
    wherein the at least one memory and the instructions are configured to, with the at least one processor, cause the apparatus at least to perform
    organizing computing resources of the core network element into sets, wherein a first set is always active, and wherein a load of incoming traffic is associated with each set;
    controlling distribution of incoming traffic by setting an upper threshold and a lower threshold for the load of the sets, wherein the sets in operation are loaded as long as the average load of the sets in operation reaches the upper threshold, and when the upper threshold is exceeded, a new set is activated, whereas, when the load of the last activated set falls below the lower threshold, the last activated set is deactivated;
    assigning a priority number to each set which provides an indication of an amount of traffic manageable by each set;
    segmenting an interval of a group of random numbers for randomizing a request distribution into subintervals which are allocated to the computing resources of the active sets, wherein the length of each subinterval is determined based on the priority number of the set of the respective computing resource; and
    allotting a random number out of the interval to an incoming request, and forwarding the request to such computing resource which belongs to the subinterval that contains the allotted random number,
    wherein, if the load of a single set reaches the upper threshold, its priority number becomes maximal, indicating that the set receives incoming requests with highest priority.

7. The apparatus according to claim 6, wherein the bigger the priority number is, the longer is the length of the subinterval.

8. The apparatus according to claim 6, wherein, when a set of computing resources is in an inactive state or already scaled in, its priority number
    indicating zero priority.

9. The apparatus according to claim 6, wherein, if a new set is loaded, its priority number is dynamically changeable from a preset starting value up to its maximal value, dependent on the real-time traffic.

10. The apparatus according to claim 6, wherein the core network element is a Telecommunication Application Server, a Mobile Switching Server, a Mobility Management Entity, a Serving GPRS Support Node, or a call processing node.

11. A computer program product embodied on a non-transitory computer-readable medium, comprising software code portions for performing the steps, when said product is run on a computer, of
- organizing computing resources of the core network element into sets, wherein a first set is always active, and wherein a load of incoming traffic is associated with each set;
- controlling distribution of incoming traffic by setting an upper threshold and a lower threshold for the load of the sets, wherein the sets in operation are loaded as long as the average load of the sets in operation reaches the upper threshold, and when the upper threshold is exceeded, a new set is activated, whereas, when the load of the last activated set falls below the lower threshold, the last activated set is deactivated;
- assigning a priority number to each set which provides an indication of an amount of traffic manageable by each set;
- segmenting an interval of a group of random numbers for randomizing a request distribution into subintervals which are allocated to the computing resources of the active sets, wherein the length of each subinterval is determined based on the priority number of the set of the respective computing resource; and
- allotting a random number out of the interval to an incoming request, and forwarding the request to such computing resource which belongs to the subinterval that contains the allotted random number,
- wherein, if the load of a single set reaches the upper threshold, its priority number becomes maximal, indicating that the set receives incoming requests with highest priority.

12. The computer program product according to claim 11, wherein
- the computer-readable medium is directly loadable into the internal memory of the computer and/or transmittable via a network by means of at least one of upload, download and push procedures.

* * * * *